United States Patent
Tochihara

(10) Patent No.: US 6,810,265 B2
(45) Date of Patent: Oct. 26, 2004

(54) INPUT DEVICE AND PORTABLE ELECTRONIC DEVICE USING SAME

(75) Inventor: Katsuhiko Tochihara, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 467 days.

(21) Appl. No.: 09/802,649

(22) Filed: Mar. 9, 2001

(65) Prior Publication Data
US 2001/0021658 A1 Sep. 13, 2001

(30) Foreign Application Priority Data
Mar. 10, 2000 (JP) ........................................ 2000-072476

(51) Int. Cl.[7] .............................................. H04Q 7/32
(52) U.S. Cl. ................ 455/550.1; 455/90.3; 455/525.1; 200/4
(58) Field of Search ................................ 455/550, 575, 455/90, 566, 564, 462; 379/368, 433.06, 433.07; 200/4, 14, 18; 345/169, 161, 163, 167

(56) References Cited

U.S. PATENT DOCUMENTS

| | | | |
|---|---|---|---|
| 5,436,954 A | | 7/1995 | Nishiyama et al. |
| 5,563,631 A | * | 10/1996 | Masunaga .................. 345/169 |
| 6,062,749 A | | 5/2000 | Oikawa et al. |
| 6,097,964 A | * | 8/2000 | Nuovo et al. ................ 455/566 |
| 6,211,474 B1 | * | 4/2001 | Takahashi .................... 200/18 |
| 6,218,635 B1 | * | 4/2001 | Shigemoto et al. .......... 200/570 |
| 6,271,488 B1 | * | 8/2001 | Sasaki ........................... 200/4 |
| 6,333,473 B1 | * | 12/2001 | Sawada et al. ................ 200/4 |
| 6,351,657 B2 | * | 2/2002 | Yamada ...................... 455/566 |
| 6,441,325 B2 | * | 8/2002 | Takahashi et al. ............. 200/4 |
| 6,496,181 B1 | * | 12/2002 | Bomer et al. ................ 345/167 |
| 6,555,768 B2 | * | 4/2003 | Deruginsky et al. ........... 200/4 |
| 6,611,254 B1 | * | 8/2003 | Griffin et al. ................ 345/169 |

FOREIGN PATENT DOCUMENTS

| | | | |
|---|---|---|---|
| DE | 199 06 386 A1 | 8/2000 | |
| DE | 19906386 A1 * | 8/2000 | .......... H01H/25/06 |
| EP | 1 014 410 A1 | 6/2000 | |
| GB | 2260598 A * | 4/1993 | .......... G05G/9/047 |
| JP | 04 220710 | 11/1992 | |
| JP | 2909854 | 4/1999 | |
| JP | 2000-132311 | 5/2000 | |

* cited by examiner

Primary Examiner—Pablo N. Tran
(74) Attorney, Agent, or Firm—Brinks Hofer Gilson & Lione

(57) ABSTRACT

An input device and a portable electronic device using the input device are disclosed, wherein a first selection item is selected by a first rotary electric part through a first operating member and a second selection item is selected by a second rotary electric part through a second operating member. The input device and the portable electronic device are simple and easy to operate and are excellent in operability.

3 Claims, 8 Drawing Sheets

INPUT DEVICE AND PORTABLE ELECTRONIC DEVICE USING SAME

BACKGROUND OF THE INVENTION

1. Field of the Invention

The present invention relates to an input device for use in a portable electronic device such as a portable telephone set.

2. Description of the Prior Art

In a conventional input device used in a portable electronic device, a plurality of push-buttons for operating switches are provided and numerals, as well as hiragana and katakana characters, are described in upper surfaces of the push-buttons.

In such a conventional input device, when a character, e.g., the character "こ(ko)" is to be selected from "あ～ん(a to n)," one push-button corresponding to the か(ka) series is selected (the first selection item) and is then pushed five times to select "こ(ko)" (the second selection item).

After the selection of "こ(ko)," a decision is made by pushing another push-button.

Such operations are repeated to prepare a desired sentence, which is displayed on a display unit.

In the conventional input device, however, since the first selection item is selected from among many push-buttons and the selected push-button is pushed many times to select the second selection item, the operations are complicated and the operability of the input device is extremely low.

SUMMARY OF THE INVENTION

Accordingly, it is an object of the present invention to provide an input device simple and easy to operate, excellent in operability and suitable for use in a portable electronic device.

According to the first solving means adopted by the invention for solving the above-mentioned problem there is provided an input device comprising a first operating member for operating a first rotary electric part and a second operating member for operating a second rotary electric part, wherein a first selection item is selected by the first rotary electric part through the first operating member and a second selection item is selected by the second rotary electric part through the second operating member.

According to the second solving means adopted by the invention there is provided, in combination with the above first means, an input device further including a push-switch adapted to be operated by at least one of the first and second operating members, and the selection of at least one of the first and second selection items is decided by the push-switch.

According to the third solving means adopted by the invention there is provided, in combination with the above first means, an input device wherein the first and second operating members are positioned in alignment with each other.

According to the fourth solving means adopted by the invention there is provided, in combination with the above second means, an input device wherein the push-switch is disposed so as to straddle the first and second operating members and is operated by the operation of each of the first and second operating members.

According to the fifth solving means adopted by the invention there is provided, in combination with the above first means, an input device wherein row items of information pieces arranged in a matrix form are selected by the first operating member, column items of the matrix information pieces are selected by the second operating member, and the information piece determined by selected row and column items is inputted.

According to the sixth solving means adopted by the invention there is provided a portable electronic device having an input device, the input device comprising a first operating member for operating a first rotary electric part and a second operating member for operating a second rotary electric part, wherein a first selection item is selected by the first rotary electric part through the first operating member and a second selection item is selected by the second rotary electric part through the second operating member.

DETAILED DESCRIPTION OF THE PREFERRED EMBODIMENT

Figure 1:
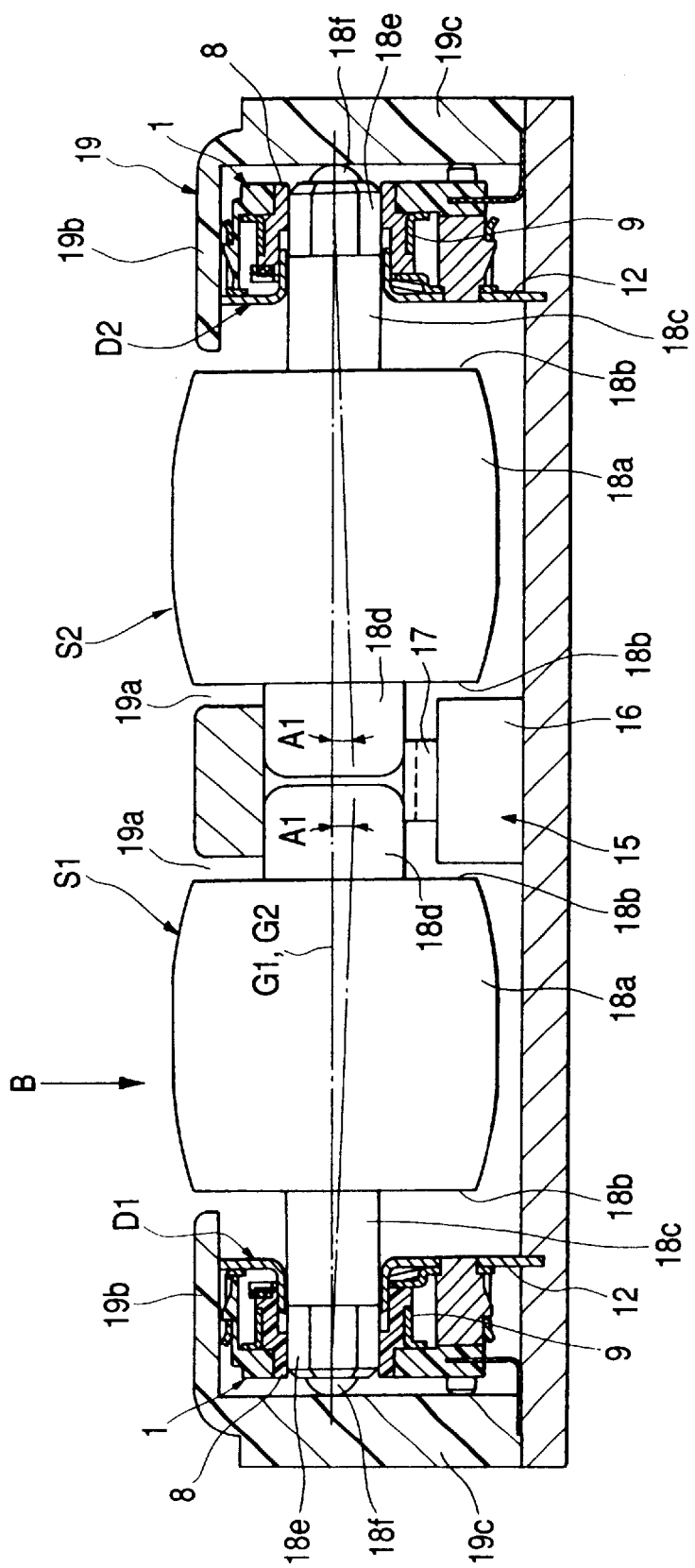
FIG. 1 is a sectional view of a principal portion of an input device embodying the present invention.
Figure 2:
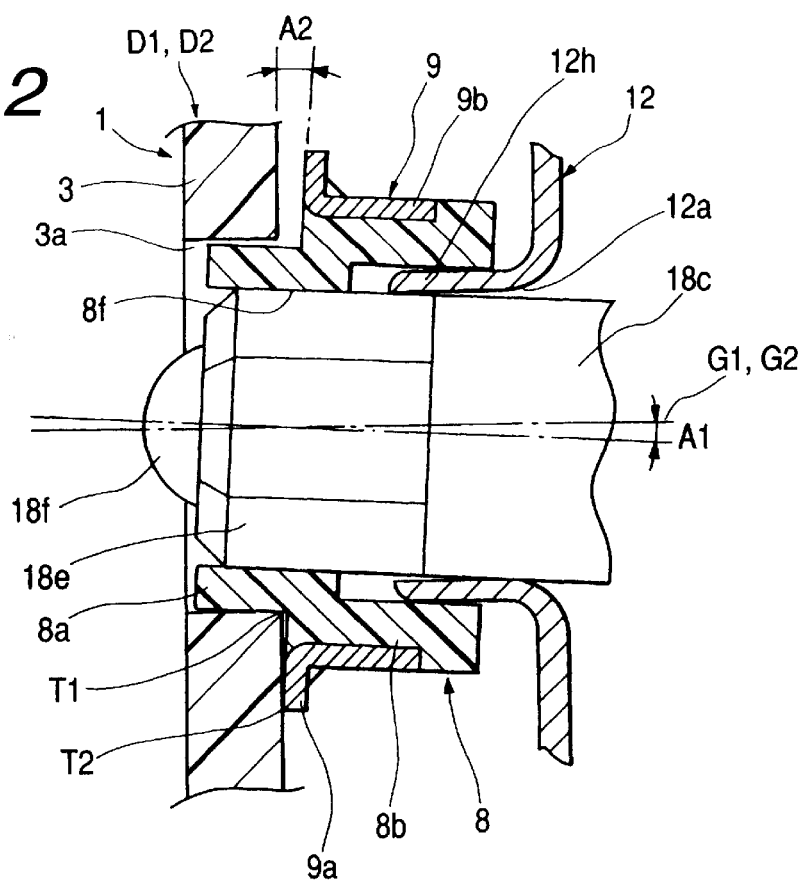
FIG. 2 is an enlarged sectional view of a principal portion, illustrating the operation of the input device.

The drawings of an input device embodying the present invention will now be described. FIG. 1 is a sectional view of a principal portion of the input device and FIG. 2 is an enlarged sectional view of a principal portion, showing the operation of the input device.

Figure 3:
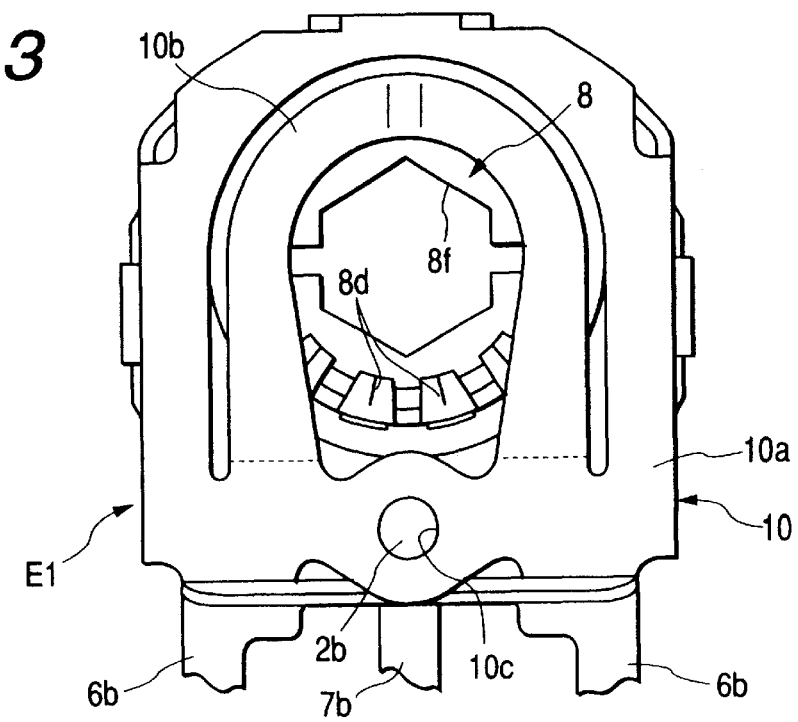
FIG. 3 is a front view of an encoder body used in the input device.
Figure 4:
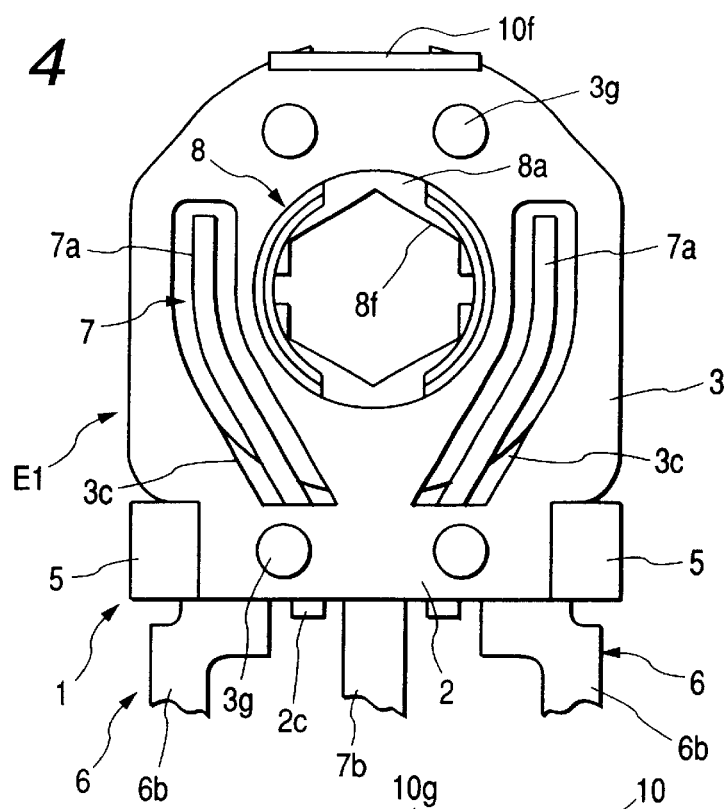
FIG. 4 is a rear view of the encoder body.
Figure 5:
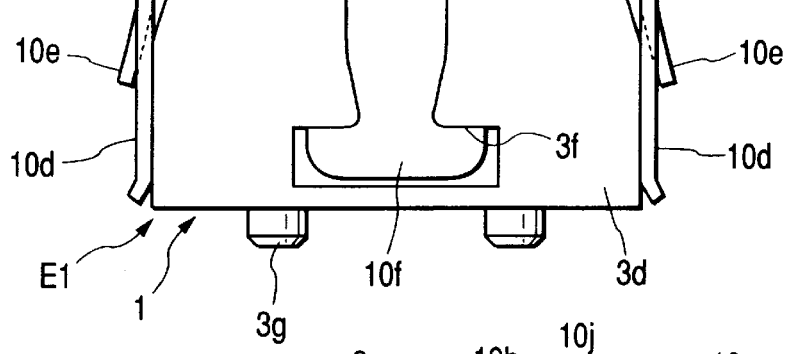
FIG. 5 is a top view of the encoder body.
Figure 6:
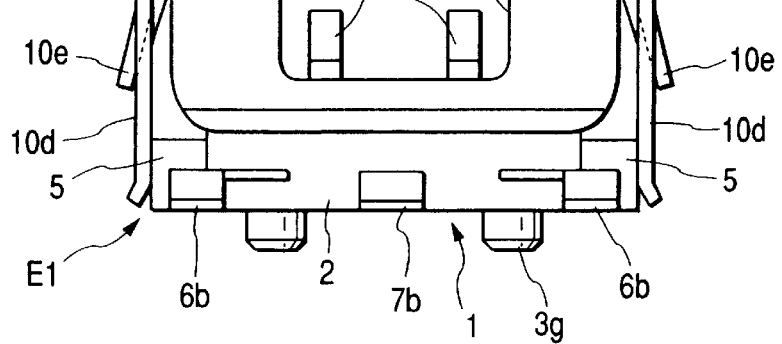
FIG. 6 is a bottom view of the encoder body.
Figure 7:
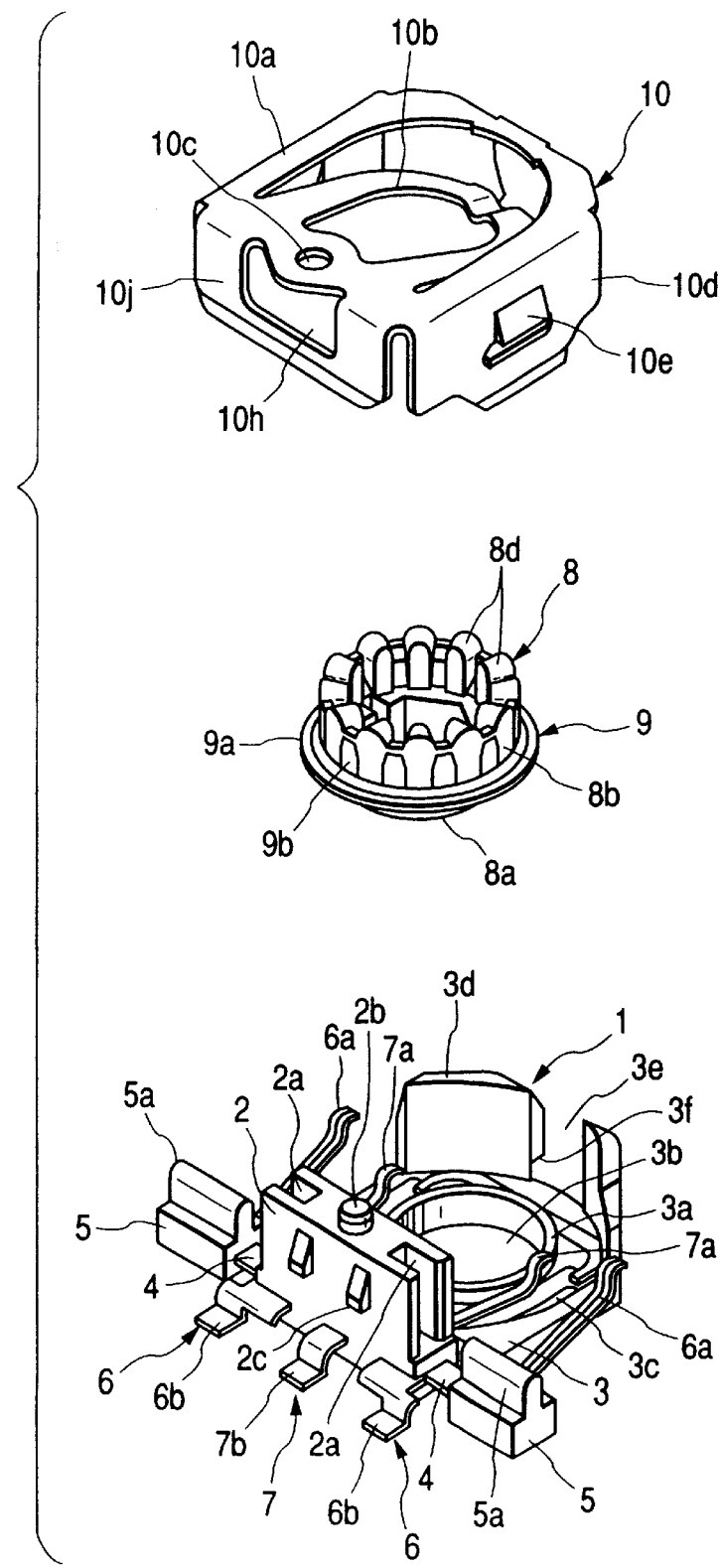
FIG. 7 is an exploded perspective view of the encoder body.
Figure 9:
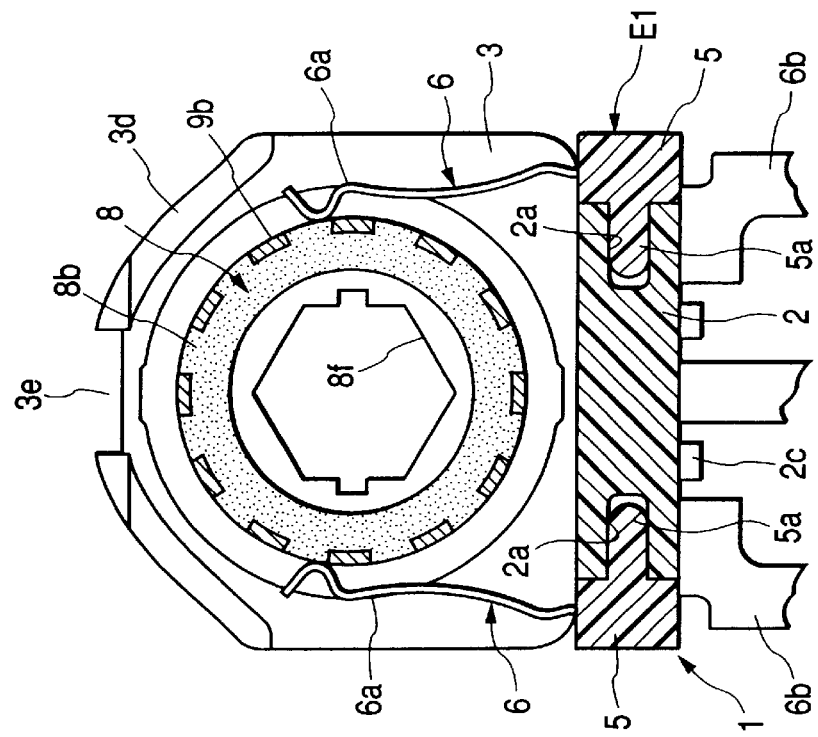
FIG. 9 is a sectional front view of a principal portion of the encoder body.
Figure 8:
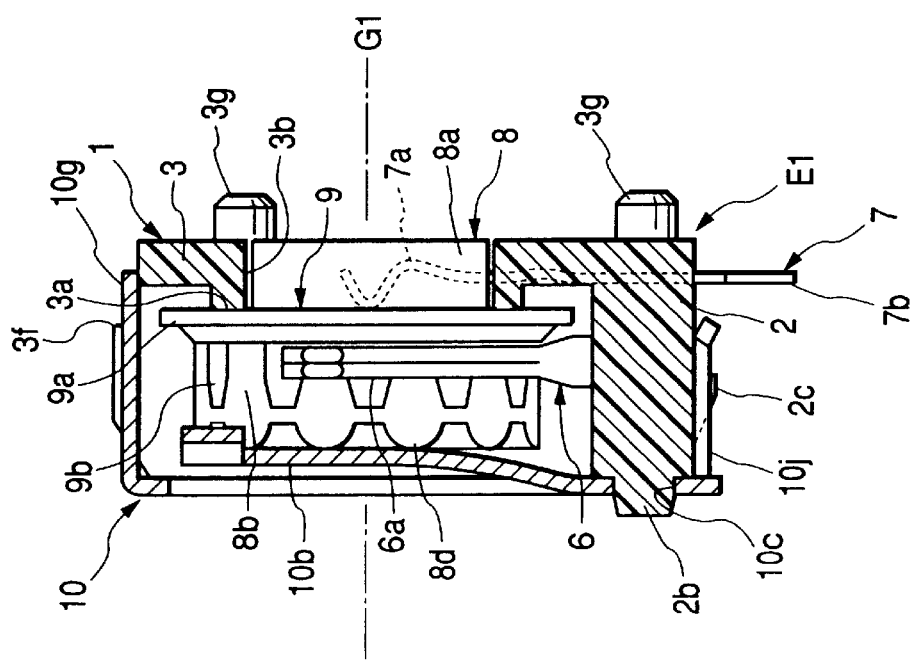
FIG. 8 is a sectional side view of a principal portion of the encoder body.

FIG. 3 is a front view of an encoder body in the input device, FIG. 4 is a rear view of the encoder body, FIG. 5 is a top view of the encoder body, FIG. 6 is a bottom view of the encoder body, FIG. 7 is an exploded perspective view of the encoder body, FIG. 8 is a sectional side view of the encoder body, and FIG. 9 is a sectional front view of a principal portion of the encoder body.

Figure 10:
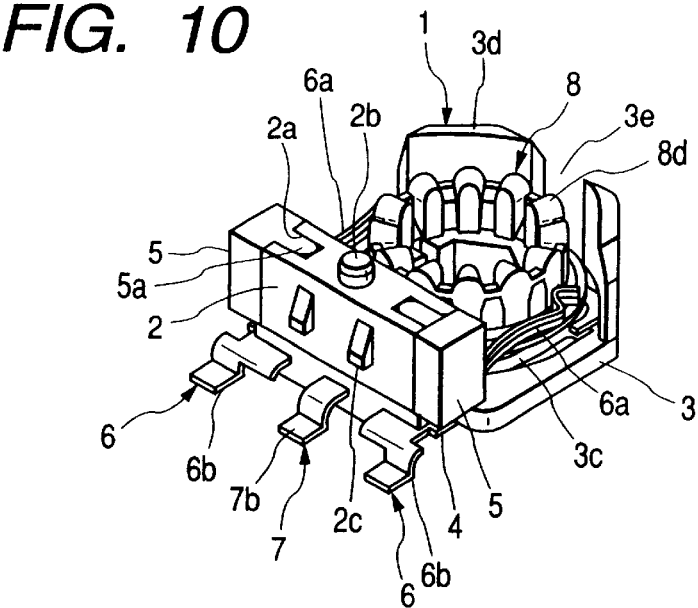
FIG. 10 is a perspective view showing a combination of an insulating base and a rotor in the encoder body.
Figure 11:
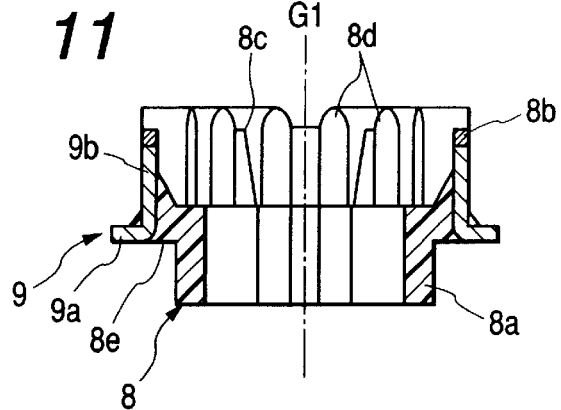
FIG. 11 is a sectional view of a rotor mounted in the encoder body.
Figure 12:
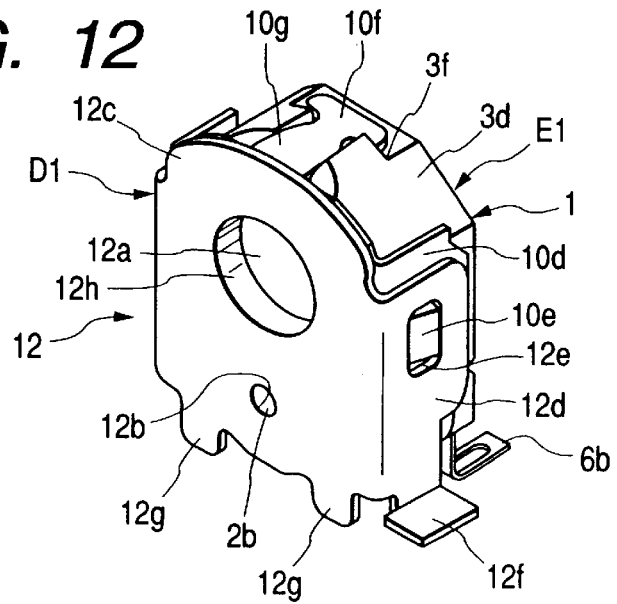
FIG. 12 is a perspective view of a rotary electric part used in the input device.
Figure 13:
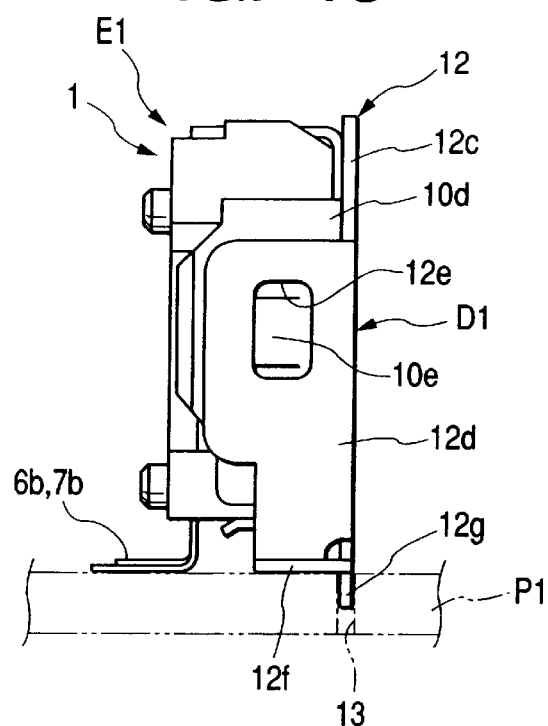
FIG. 13 is a side view of the rotary electric part.
Figure 14:
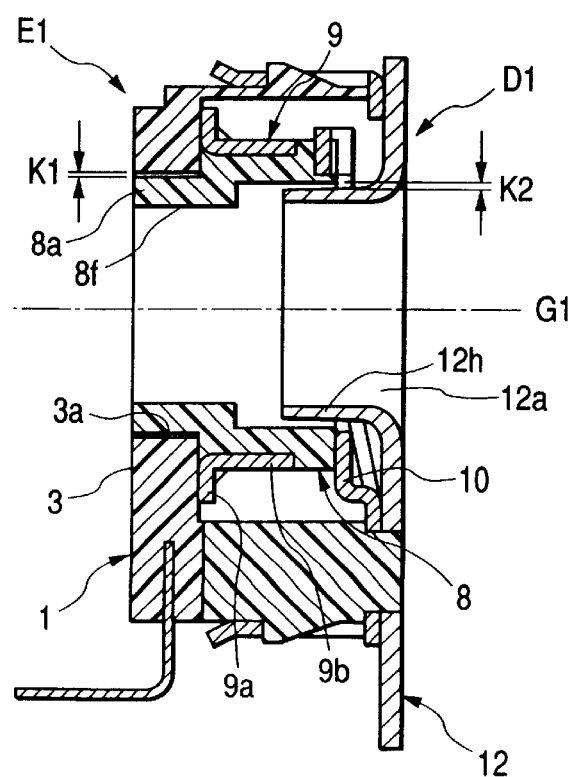
FIG. 14 is a sectional view of the rotary electric part.
Figure 15:
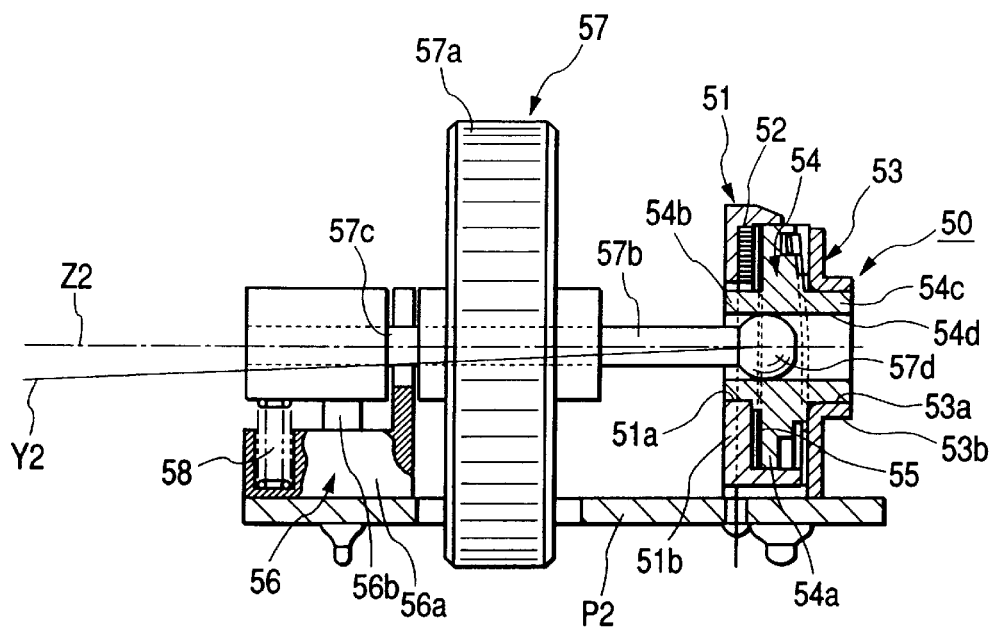
FIG. 15 is a sectional view of a principal portion of a conventional input device.

FIG. 10 is a perspective view showing a combination of an insulating base and a rotor in the encoder body, FIG. 11 is a sectional view of a rotor mounted in the encoder body, FIG. 12 is a perspective view of a rotary electric part used in the input device, FIG. 13 is a side view of the rotary electric part, and FIG. 14 is a sectional view thereof.

With reference particularly to FIGS. 3 to 14, a description will first be given about the configuration used in the input device embodying the present invention. The rotary electric part D used in this embodiment is formed as a rotary encoder. An insulating base 1, which is formed by molding an insulating material, is made up of a rectangular main base portion 2, a sidewall portion 3 which is upright at right angles from the main base portion 2, and a pair of sub-base portions 5 connected respectively both sides of the main base portion 2 through thin-walled portions 4.

The main base portion 2 is provided with recesses 2a formed respectively in end faces on both sides, a cylindrical protrusion 2b formed centrally on a front end face, and a pair of retaining portions 2c formed on a lower surface of the main base portion and each having a tapered portion.

The side wall portion 3 is formed upright from corners of an upper surface of the main base portion 2. The side wall portion 3 is provided with a central circular hole 3b having a flange 3a, a pair of relief holes 3c extending from both sides of the hole 3b up to the main base portion 2, a pair of upper walls 3d extending perpendicularly from an upper position, a groove 3e formed between the paired upper walls 3d, retaining portions 3f formed respectively on upper surfaces of the paired upper walls 3d, and protrusions 3g.

Each of the paired sub-base portions 5 is provided with a convex portion 5a formed on an end face and having a roundish end.

By bending the thin-walled portions 4 in the state shown in FIG. 7 and by press-fitting the protrusions 5a of the sub-base portions 5 into the recesses 2a of the main base portion 2, there is formed a rectangular insulating base 1, as shown in FIG. 10.

A plurality of contact pieces 6 each formed by a metallic plate are each provided with a contact portion 6a and a terminal portion 6b. The contact pieces 6 are respectively embedded in the sub-base portions 5. The contact portion 6a projects upward from an upper surface of the insulating base 1, while the terminal portion 6b projects downward from a lower surface of the insulating base 1 and a flat surface of an outer end thereof is bent so as to be positioned in parallel with and at substantially the same position as one end of the insulating base 1, i.e., the side wall portion 3.

A common contact piece 7, which is formed of a metal, is provided with a pair of contact portions 7a and a terminal portion 7b. The common contact piece 7 is embedded in the main base portion 2 at a position close to the side wall portion 3. The contact portions 7a project upward from the upper surface of the insulating base 1 and are positioned in the relief holes 3c of the side wall portion 3, while the terminal portion 7b projects downward from the lower surface of the insulating base 1.

In this embodiment, part of each embedded contact piece 6 straddles the main base portion 2 and the associated sub-base portion 5 and constitutes each thin-walled portion 4 as a connection between the main and sub-base portions 2, 5.

A metallic plate separate from that of the contact piece 6 may be embedded in the insulating base 1 to form each thin-walled portion 4. Further, the thin-walled portion 4 as a connection between the main and sub-base portions 2, 5 may be formed by the insulating material of the insulating base 1.

A cylindrical rotor 8, which is formed by molding an insulating material, comprises a shaft portion 8a provided on one end side, a holding portion 8b formed contiguously to the shaft portion 8a and having a diameter larger than the diameter of the shaft portion 8a, a concave-convex portion 8d for clicking which is formed on an end face 8c on one side of the holding portion 8b which end face is orthogonal to a rotational axis direction of the rotor, and end face 8e positioned between the shaft portion 8a and the holding portion 8b on an opposite side of the holding portion 8b, the end face 8e being orthogonal to the rotational axis direction of the rotor, and a non-circular, hexagonal hole 8f formed centrally.

A code member 9, which is formed by a metallic plate, is provided with a ring-like plate portion 9a which forms a common pattern and a plurality of tongue pieces 9b which are bent from an inner periphery of the plate portion 9a and which form code patterns, as shown particularly in FIG. 11.

The code member 9 is embedded or press-fitted into the rotor 8. The ring-like plate portion 9a which forms a common pattern is positioned at the end face 8e of the rotor 8, while the tongue pieces 9b which form a code pattern are exposed to an outer circumferential surface of the holding portion 8b. The tongue pieces 9b extend in an axial direction G1 of the rotor 8.

The shaft portion 8a of the rotor 8 is inserted into the hole 3b of the side wall portion 3, whereby the rotor 8 and the code member 9 both constituted as above are held rotatably.

In this case, as shown in FIG. 14, the shaft portion 8a is fitted in the hole 3b loosely so as to create a small clearance K1, thereby permitting the rotor 8 to perform a tilting motion with respect to the insulating base 1.

When the rotor 8 is mounted to the insulating base 1, the paired contact portions 7a of the common contact piece 7 are opposed to the end face 8e and are in contact with the plate portion 9a as a common pattern of the code member 9.

With the rotor 8 mounted to the insulating base 1, the plural contact pieces 6 are positioned on opposite sides with the circumferential surface of the rotor 8 therebetween and come into and out of contact with the tongue pieces 9b as code patterns of the code member 9, and a pair of contact portions 6a contact the code patterns with a phase difference.

At this time, as shown in FIG. 8, the contact pieces 6 are located perpendicularly to the axial direction G1 and are put in sliding contact with code patterns.

An engaging member 10, which is formed by a metallic plate, comprises a rectangular plate-like base portion 10a, an engaging portion 10b formed by cutting and bending a central part of the base portion 10a in C shape, the engaging portion 10b having convex portions at free ends thereof, a circular hole 10c formed in a lower position of the base portion 10a, a pair of side plates 10d bent from both sides of the base portion 10a, cut and raised portions 10e formed in the side plates 10d respectively, a T-shaped upper-side plate log bent from an upper side of the base portion 10a and having a retaining portion 10f at a free end thereof, and a C-shaped lower-side plate 10j bent from a lower side of the base portion 10a and having a rectangular hole 10h formed centrally.

The engaging member 10 is aligned with the insulating base 1 so that the engaging portion 10b becomes opposed to the end face 8c of the rotor 8 having the concave-convex portion 8d, and then the protrusion 2b is inserted into the hole 10c.

Thereafter, the upper-side plate 10g is positioned on the upper walls 3d of the side wall portion 3 and is pushed in, allowing the retaining portion 10f to be engaged with the retaining portions 3f. Further, the upper-side plate 10g is positioned in the groove 3e and is secured to the side wall portion 3.

Simultaneously with the mounting of the upper-side plate 10g the lower-side plate 10j is positioned on the lower surface of the main base portion 2 and is pushed in, allowing the retaining portions 2c to be positioned in the hole 10h, whereby the lower-side plate 10j is locked to the retaining portions 2c and the lower-side plate 10j is secured to the main base portion 2.

In this way the engaging member 10 is mounted at both upper and lower positions relative to the rotor 8, while the side plates 10d are located at right and left positions respectively relative to the rotor 8.

When the engaging member 10 is mounted, the convex portions of the engaging portion 10b are engaged disengageably with the concave-convex portion 8d formed on the end face 8c of the rotor 8, constituting a click mechanism.

Further, the engaging member 10, the contact pieces 6 and the common contact piece 7 extend toward the rotor 8 with the insulating base 1 as a reference plane.

An encoder body E1 is formed by such a configuration.

As shown in FIGS. 12 to 14, a mounting plate 12, which is constituted by a solderable metallic plate, comprises a flat plate portion 12c, the flat plate portion 12c having a cylindrical portion 12h formed with a large circular hole 12a centrally and also having a small hole 12b in a lower position, a pair of arm portions 12d bent opposedly from both sides of the flat plate portion 12c, rectangular holes 12e formed centrally of the arm portions 12d respectively, mounting portions 12f bent from side ends of the arm portions 12d, and projecting portions 12g provided on the mounting portions 12f side of the flat plate portion 12c.

As shown in FIGS. 12 to 14, the mounting plate 12 is positioned on the engaging member 10 side of the encoder body E1 and the cylindrical portion 12h is positioned within the rotor 8, then in this state the protrusion 2b of the insulating base 1 is inserted into the small hole 12b.

Thereafter, the arm portions 12d are pushed inwards on the side plates 10d of the engaging member 10, so that the cut and raised portions 10e are positioned in the holes 12e respectively and the arm portions 12d are engaged with the cut and raised portions 10e, whereby the mounting plate 12 is snap-fastened to the engaging member 10.

When the mounting plate 12 is thus mounted, the flat plate portion 12c is superimposed outside on the plate-like base portion 10a of the engaging member 10, the arm portions 12d are mounted to the side plate 10d of the engaging member 10 respectively at right and left positions with respect to the rotor 8. Lower surfaces of the mounting portions 12f bent from side ends of the arm portions 12d which extend in the axial direction G1 of the rotor 8 are located at approximately the same position as the L-shaped terminal portions 6b and 7b of the contact pieces 6 and the common contact piece 7 both extending from the lower surface of the insulating base 1.

When the mounting plate 12 is mounted, as shown in FIG. 14, a clearance K2 is formed between the cylindrical portion 12h and the rotor 8, the clearance K2 being larger than the clearance K1.

The rotor 8 is brought into abutment against the side wall portion 3 by the engaging member 10.

In this way there is formed a rotary encoder as the rotary electric part D. It goes without saying that the rotary encoder may be substituted by another rotary electric part.

In the rotary electric part D with the mounting plate 12 attached thereto, as shown in FIG. 13, the undersides of the main and sub-base portions 2, 5 are brought into opposition to a printed circuit board P1 and the projecting portions 12g are inserted into holes 13 formed in the printed circuit board P1, whereby the rotary electric part D is established its position. At the same time, the terminal portions 6b and 7b of the contact pieces 6 and the common contact piece 7, and the mounting portions 12f of the mounting plate 12, are positioned on wiring patterns (not shown) formed on an upper surface of the printed circuit board P1.

The contact pieces 6, the common contact piece 7 and the mounting plate 12 thus constituted are surface-mounted to the wiring patterns by creamy solder and thus mounted to the printed circuit board P1, whereby the rotary electric part D is mounted to the printed circuit board in parallel with the axial direction G1 of the rotor 8.

A description will now be given about the operation of the rotary encoder as the rotary electric part D constructed as above. First, an operating member 18 to be described later is fitted and engaged into the hole 8f of the rotor 8 through the hole 12a of the mounting plate 12 and is then rotated, so that the rotor 8 and the code member 9 rotate with the shaft portion 8a as a support portion.

The concave-convex portion 8d of the rotor 8 performs engaging and disengaging motions for the engaging portion 10b to effect a click motion, the tongue pieces 9b come into and out of contact with the contact pieces 6, and the common contact piece 7 contacts the plate portion 9a constantly, with consequent generation of a two-phase pulse signal between the contact pieces 6 and the common contact piece 7.

In this input device of this embodiment, as shown in FIG. 1, first and second rotary electric parts D1, D2, as the rotary electric part D constituted as above, are mounted to the printed circuit board P1 spacedly in alignment with each other through mounting plates 12 which are opposed to each other, as shown in FIG. 1.

As shown in FIG. 1, a push-switch 15 is made up of a housing 16 which houses a contact portion (not shown) therein and a push-button 17 which is secured to the housing 16 vertically movably and which is urged upwards constantly. The push-switch 15 is mounted to the printed circuit board P1 at a position intermediate between the first and second rotary electric parts D1, D2 and on an extension of the axial direction G1.

First and second operating members S1, S2, which are formed by molding a synthetic resin, each comprise a cylindrical operating portion 18a of a large diameter, first and second cylindrical shafts 18c, 18d smaller in diameter than the operating portion 18a, the shafts 18c and 18d projecting in an axial direction G2 of the operating member 18 from central positions of both side faces 18b of the operating portion 18a, a hexagonal, non-cylindrical, non-circular portion 18e formed at an end portion of the first shaft 18c, and a semi-spherical protuberance 18f formed at an end face of the first shaft 18c.

The first shafts 18c of the first and second operating members S1, S2 are respectively inserted into the holes 12a from the mounting plates 12 side of the first and second rotary electric parts D1, D2 while being guided by the cylindrical portions 12h, and the non-circular portions 18e are fitted respectively in the non-circular holes 8f of the rotors 8.

At this time, the non-circular portions 18e and the holes 8f are fitted together tightly, leaving no play between the two in the rotational direction.

When the first shafts 18c are inserted into the holes 8f, protuberances 18f project outwards from the holes 8f and the second shafts 18d are close to each other and abutted against the top of the push-button 17.

In this state, the axial directions G1 and G2 of the rotor 8 and the first and second operating members S1, S2, respectively, are aligned with each other, as shown in FIG. 1.

As shown in FIG. 1, a case 19, which is formed by molding a synthetic resin, comprises an upper wall 19b having two parallel holes 19a, and side walls 19c extending downwards from the outer periphery of the upper wall 19b.

The case 19 is affixed to the printed circuit board P1 while covering the first and second rotary electric parts D1, D2 and also covering the push-switch 15. When the case 19 is thus mounted, part of the operating portions 18a of the first and second operating members S1, S2 projects outwards from the holes 19a, the protuberances 18f are abutted against or close to side walls 19c, and the second shafts 18d are close to each other, to prevent the first and second operating members S1, S2 from moving in the axial direction G2.

The second shafts 18d of the first and second operating members S1, S2 are positioned close to each other and are simultaneously supported by the upper wall 19b.

Reference will now be made to the operation of the input device of this embodiment which is constituted as described above.

First, the operating portion 18a of the first operating member S1 projecting from the associated hole 19a is rotated with a finger, with consequent rotation of the first and third shafts 18c, 18d and subsequent rotation of the code member 9 together with the rotor 8 through the non-circular portion 18e, so that the contact pieces 6 come into sliding contact with the tongue pieces 9b as code patterns, producing a pulse signal.

There is made pre-setting so that the pulse signal is OFF when the engaging member 10 is engaged with a concave section in the concave-convex portion 8d.

Next, if the operating portion 18a of the first operating member S1 is pushed in a direction B orthogonal to the axial direction G2, the operating member S1 tilts at a predetermined angle A1 on its second shaft 18d side with the first rotary electric part D1 as fulcrum, as shown in FIG. 2, with the result that the push-button 17 moves downward and the push-switch 15 is operated (contact ON to OFF or OFF to ON).

More specifically, the tilting motion of the first operating member S1 is performed in the following manner. As shown in FIG. 2, when the operating member S1 is pushed, first a lower portion of the shaft 8a of the rotor 8 comes into abutment with the side face of the insulating base 1 which defines the hole 3b. As the operating member 18 is further pushed, the rotor 8 begins to tilt with an abutment portion T1 as fulcrum and at the same time the outermost periphery of the plate portion 9a of the code member 9 abuts the insulating base 1 at an abutment portion T2. With both abutment portions T2 and T1 of the code member 9 and the shaft 8a, respectively, as fulcrums, the rotor 8 tilts, and with this tilting motion of the rotor 8, the operating member S1 also tilts together with the rotor 8.

As a result, the rotor 8 tilts at a predetermined angle A2 equal to that of the operating member S1 and the mounting plate 12-side portion of the rotor 8 moves to a greater extent than the insulating base 1-side portion thereof, but the presence of the large clearance K2 permits the tilting motion of the rotor 8.

Further, when the rotor 8 tilts, the code patterns (tongue pieces 9b) extending in the axial direction G1 and the contact pieces 6 disposed perpendicularly thereto are in contact with each other, provided the position of contact of the code patterns with the contact pieces 6 merely shifts downward, and therefore both are kept contacted positively.

In addition, since the position of contact of the contact pieces 6 with the tongue pieces 9b is close to the tilt center, the tongue pieces 9b are less displaced at their contact portions with the contact pieces 6, thus making it difficult to produce unnecessary pulse signals.

Next, when the pressure imposed on the first operating member S1 is relieved, the second shaft 18d is restored to its original state by the urged push-button 17, so that the first operating member S1 and the rotor 8 are restored to their original horizontal state and the push-switch 15 also reverts to its original state. Thus, switching of contacts is performed.

During the tilting motion of the first operating member S1, the second shaft 18d is guided by a vertical groove (not shown) formed in the case 19 and thus its downward movement can be done accurately.

The operation for rotation and tilting of the second operating member S2 is the same as that for the first operating member S1 described above, so an explanation thereof will here be omitted. The input device of this embodiment is operated in the manner described above.

In the case where the input device of this embodiment is applied to a portable electronic device, since the first and second operating members S1, S2 are positioned in alignment with each other, the above operation can be done by a finger of one hand put on the first operating member S1 and another finger put on the second operating member S2. Thus the operability of the input device is improved.

In the case of applying the input device of this embodiment to a portable electronic device and selecting a character, e.g., the character "こ(ko)" out of the characters "あ~ん(a to n)," with use of the input device, the first operating member S1 is used for selecting the first selection item, i.e., column. In this case, "the か(ka) series" is selected by rotating the first operating member S1.

Next, the second operating member S2 is used for selecting the second selection item, i.e., row. In this case, "こ(ko)" is selected by rotating the second operating member S2.

Thereafter, if the second operating member S2 or the first operating member S1 is pushed, the push-switch 15 is operated to give a decision on the selected item.

These operations are repeated to prepare a desired sentence, which is displayed on the display unit.

The selection of characters has been described above, but also as to information pieces or the like for which plural selection items, as well as plural selection items common to them, are defined, i.e., information pieces arranged in a matrix form, the selection can be done by performing the above operations. Further, the selection items covered by the first and second operating members S1, S2, respectively, may be reversed.

For example, in the input device being considered, "date" and "time" maybe adopted as the first and second selection items, respectively, for which selection and decision may be made. Likewise, the first and second selection items maybe "language" and "various items," respectively, and there may be made selection and decision for them. It goes without saying that the input device of the invention can be utilized in any other selection.

Although in the above embodiment the tilting motion of the rotor 8 is conducted with the insulating base 1 as a support member, the mounting plate 12 or another member may be used as the support member.

[Effect of the Invention]

In the input device according to the present invention, since the first selection item is selected by the first rotary electric part D1 through the first operating member S1 and the second item is selected by the second rotary electric part D2 through the second operating member S2, both selection items can be selected by only rotating the first and second operating members S1, S2. This operation is simple and easy in comparison with the prior art and the input device is excellent in operability.

In addition, since the input device is provided with the push-switch 15 which is operated by at least one of the first and second operating members S1, S2 and a decision on the selection of at least one of the first and second selection items is made by the push-switch 15, a completing operation can be done immediately by the operating member which has completed the selecting operation. Thus, the operation is simple and the input device is superior in operability.

Moreover, since the first and second operating members S1, S2 are positioned in alignment with each other, the operation can be done with a finger of one hand put on the first operating member and another finger put on the second operating member and thus the input device is superior in operability and convenient for use.

Further, since the push-switch 15 is disposed so as to straddle the first and second operating members S1, S2 and is operated by operation of each of the first and second operating members, the push-switch 15 can be used in common to both operating members S1 and S2, thus permitting the input device to be reduced in both size and cost.

Further, in the case of selecting information pieces arranged in a matrix form, since the first and second operating members S1, S2 are rotatively operated to select row and column items, the input device is easy to operate.

Further, in the portable electronic device according to the present invention, since the input device according to the invention is used wherein the first selection item is selected by the first rotary electric part D1 through the first operating member S1 and the second selection item is selected by the second rotary electric part D2 through the second operating member S2, the first and second selection items can be selected by merely rotating the first and second operating members S1 and S2. Thus, in comparison with the prior art, the portable electronic device according to the present invention is simple and easy to operate and its operability is quite satisfactory.

What is claimed is:

1. An input device comprising:
   a first operating member for operating a first rotary electric part; and
   a second operating member for operating a second rotary electric part; and
   a push-switch adapted to be operated by at least one of the first and second operating members,
   wherein a first selection item is selected by the first rotary electric part through the first operating member and a second selection item is selected by the second rotary electric part through the second operating member, the selection of at least one of the first and second selection items is decided by the push-switch, and the push-switch is disposed so as to straddle the first and second operating members and is operated by the operation of each of the first and second operating members.

2. An input device according to claim 1, wherein the first and second operating members are positioned in alignment with each other.

3. An input device according to claim 1, wherein row items of information pieces arranged in a matrix form are selected by the first operating member, column items of the matrix information pieces are selected by the second operating member, and the information piece determined by selected row and column items is inputted.

* * * * *

UNITED STATES PATENT AND TRADEMARK OFFICE
CERTIFICATE OF CORRECTION

PATENT NO.   : 6,810,265 B2
DATED        : October 26, 2004
INVENTOR(S)  : Tochihara It is certified that error appears in the above-identified patent and that said Letters Patent is hereby corrected as shown below:

<u>Title page,</u>
Item [*] Notice, delete the phrase "by 467 days" and insert -- by 585 days --.

Signed and Sealed this

Twenty-second Day of November, 2005

JON W. DUDAS
*Director of the United States Patent and Trademark Office*